US006241010B1

(12) United States Patent
Ramm-Schmidt et al.

(10) Patent No.: US 6,241,010 B1
(45) Date of Patent: Jun. 5, 2001

(54) HEAT EXCHANGE ELEMENT AND A HEAT EXCHANGER MADE UP OF THE SAME

(75) Inventors: Leif Ramm-Schmidt, Kirkkonummi; Hemmo Eriksson, Vantaa; Petri Janhunen, Varkaus, all of (FI)

(73) Assignee: Hadwaco Ltd Oy, Helsinki (FI)

( * ) Notice: Subject to any disclaimer, the term of this patent is extended or adjusted under 35 U.S.C. 154(b) by 0 days.

(21) Appl. No.: 09/355,097

(22) PCT Filed: Jan. 22, 1998

(86) PCT No.: PCT/FI98/00055

§ 371 Date: Sep. 23, 1999

§ 102(e) Date: Sep. 23, 1999

(87) PCT Pub. No.: WO98/33029

PCT Pub. Date: Jul. 30, 1998

(30) Foreign Application Priority Data

Jan. 23, 1997 (FI) ........................................................ 970273

(51) Int. Cl.[7] ................ F28D 3/04; B01D 1/30
(52) U.S. Cl. ............. 165/115; 165/170; 159/13.3; 159/43.1
(58) Field of Search ................... 165/111, 115, 165/170; 159/13.3, 43.1

(56) References Cited

U.S. PATENT DOCUMENTS

| 5,512,141 | 4/1996 | Koistinen et al. |
| 5,927,383 | * 7/1999 | Ramm-schmidt et al. ...... 165/115 X |

FOREIGN PATENT DOCUMENTS

| 531155 | 1/1973 | (CH) . |
| 304261 | 2/1989 | (EP) ........................................ 165/170 |
| 840667 | 2/1984 | (FI) . |
| 62-13995 | * 1/1987 | (JP) ........................................ 165/153 |
| 62-13996 | * 1/1987 | (JP) ........................................ 165/170 |
| 62-139997 | * 1/1987 | (JP) ........................................ 165/170 |
| 7116145 | 12/1970 | (SE) . |
| 0920 | 5/1980 | (WO) . |
| 1977 | 3/1990 | (WO) . |
| 2209 | 2/1991 | (WO) . |

* cited by examiner

Primary Examiner—Leonard Leo

(57) ABSTRACT

The invention relates to a heat exchange element (1) which is made up of a bag of a film material, such as plastic film, and to a heat exchanger made up of such heat exchange elements, the heat exchanger being suitable, for example, for the evaporation of effluents which contain solid matter, such as effluents from bleaching. The transfer of heat takes place in the bags (1) from a vapor condensing in the interior (3) of the bags to a liquid evaporating on their exterior surfaces (2). The forming evaporated vapor may be recycled via a compressor to the interior of the bags as heating vapor so that the heat exchanger will function as a distillation apparatus. According to the invention there is bonded inside the bag (1) a planar condensate-removal member, substantially narrower than the bag, for example, a circular disc (9) to which the forming condensate is arranged to flow and in which there is formed a hole (13) and at least one condensate outlet duct (8) leading to it, the film material of the bag being pierced in the area of the hole on each side of the condensate-removal member. In the heat exchanger, which has oppositely positioned bags (9) tied to form a pack, the condensate-removal members (9) are located one against another, and the apertures pierced in the film material form a condensate-collection duct common to them. The condensate-removal members being narrower than the bags enables the solid matter from the suspension being evaporated to be removed by falling through the spaces between the bottoms (10) of adjacent bags.

8 Claims, 3 Drawing Sheets

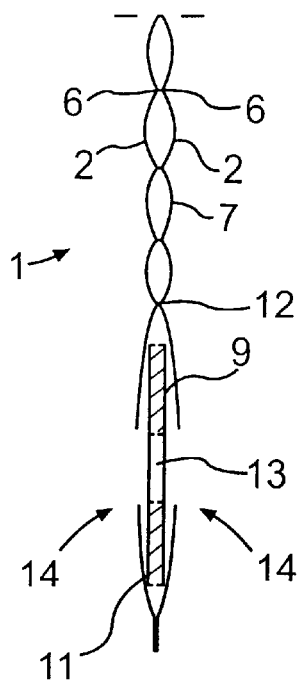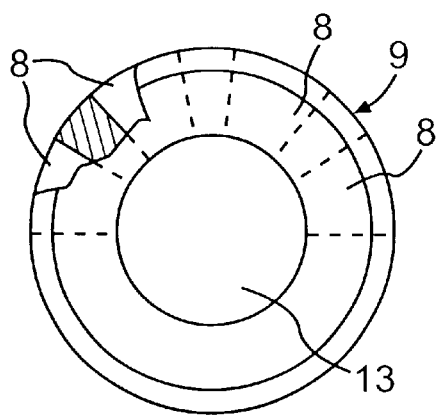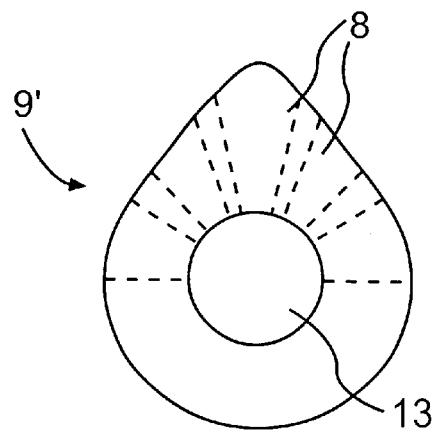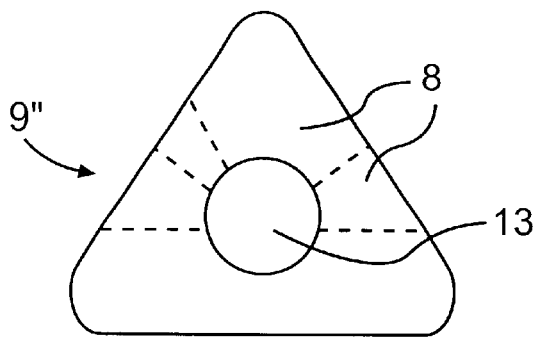
FIG. 2
FIG. 3
FIG. 4
FIG. 5

HEAT EXCHANGE ELEMENT AND A HEAT EXCHANGER MADE UP OF THE SAME

This application is the national phase under 35 U.S.C. §371 of PCT International Application No. PCT/FI98/00055 which has an International filing date of Jan. 22, 1998 which designated the United States of America.

The object of the present invention is a heat exchange element for a heat exchanger, the element being made up of a bag of a flexible film material in which heat is transferred from vapor being condensed inside the bag to a liquid being evaporated on the exterior surfaces of the bag, and at the bottom of which there is an outlet aperture for the condensate formed from the vapor.

FI lay-open print 79948 describes a heat exchanger made up of bag-like heat exchange elements in accordance with the above definition, intended in particular for the distillation of sea water to potable water. In the heat exchanger the elements are tied one against another into a pack wherein water is directed to evaporate on the exterior surfaces of the elements, whereafter the evaporated vapor is compressed by means of a compressor to a higher pressure and temperature and is directed to the inside of the elements as heating vapor, which recondenses to water during heat exchange.

Figure 1:
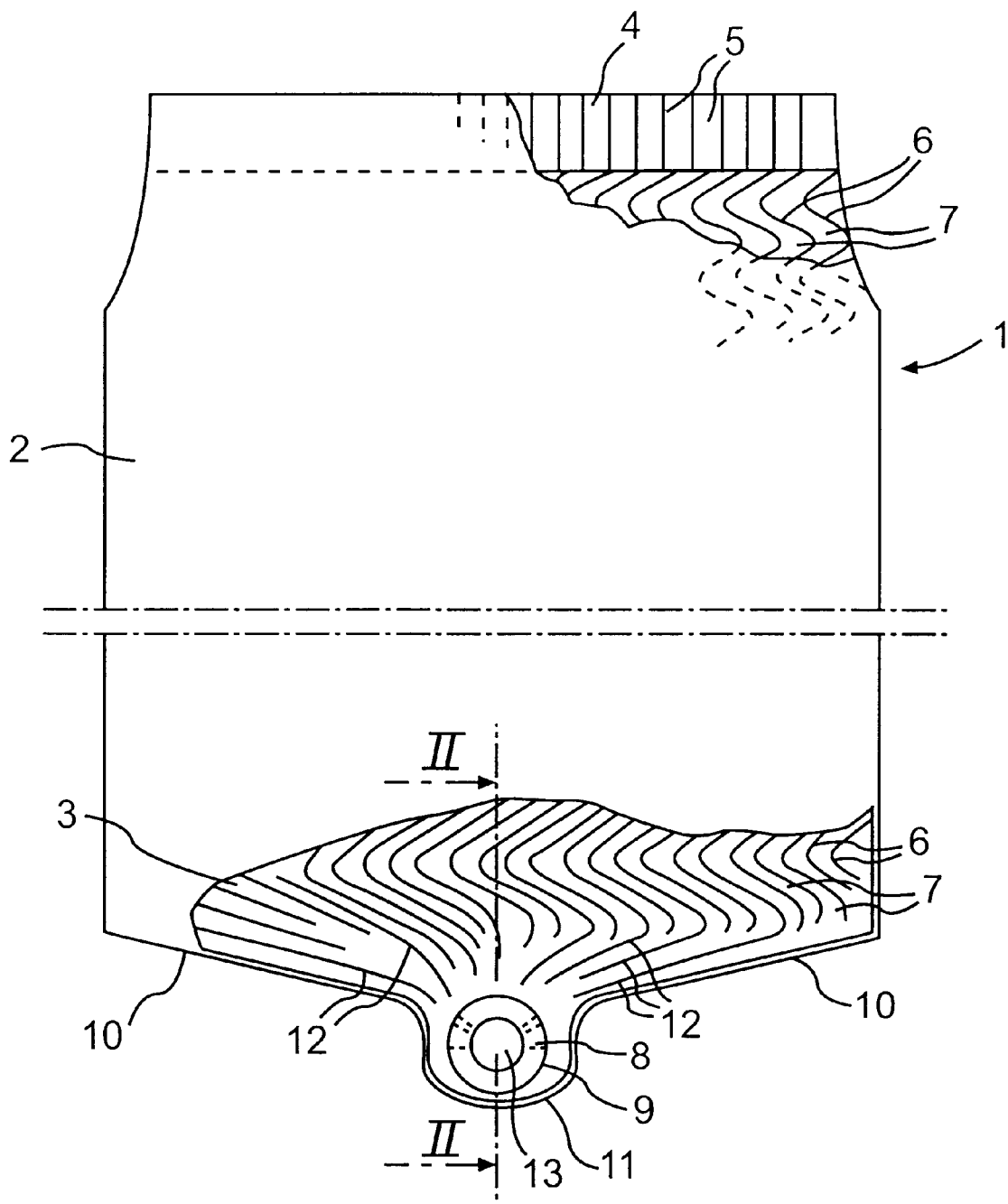

The bottom of the bag-like heat exchange element described in FI publication 79948 is, according to FIGS. 1 and 3 of said publication, inclined towards one side of the element and ends in a vertical condensate outlet duct located at a lower corner of the element. The said corner at the same time constitutes an element attachment point, and owing to its small size there is the risk that the thin plastic film may break as the element moves. The narrowness of the tubular condensate outlet duct, for its part, complicates the removal of uncondensed gases. As far as is known, at least in commercial production the element model according to said publication has not been used.

FI patent publication 86961 describes a heat exchanger comprising bag-like heat exchange elements, the applications stated for it including not only the distillation of sea water but also the concentration of various suspensions, such as bleach effluents from cellulose mills. At the lower end of the element according to said publication there is a transverse strip, which is thicker and more rigid than the film material of the element, and is constructed from honeycomb-structured sheets and contains ducts both for the condensate and for the liquid which has remained unvaporized between the elements. By means of strips supported one against another, a stable structure which withstands loading is obtained; however, its heavy weight complicates its installation. There are the furthers problems of long glued seams which withstand process conditions poorly and make it difficult to keep the structure fluid-tight and, in particular in the treatment of suspensions which contain large amounts of solid matter, the fact that the narrow outlet ducts intended for the unvaporized liquid are not capable of removing all of the solid matter carried along; instead, the solid matter begins to accumulate between the film surfaces of the elements in the lower portion of the heat exchanger. Such a solid cake prevents the flow of the condensate inside the elements and hampers the removal of uncondensed gases. Furthermore, as the amount of solid matter increases, the elements are at risk of breaking. Solid matter oozes out from between the elements towards the sides of the elements, but additionally it may at times be necessary to remove solid matter from the spaces between the elements in order to maintain the operating capacity of the heat exchanger.

The object of the present invention is to provide an option suitable in particular for the evaporation treatment of suspensions which contain solid ingredients, such as forest industry bleach effluents and other effluents which contain fibrous material, an option in which the above-mentioned disadvantages of the prior known technology are avoided. A heat exchange element according to the invention for a heat exchanger, made up of a bag of plastic or other similar film material, is characterized in that the element comprises, bonded inside the bag, a planar condensate-removal member, substantially narrower than the bag; the forming condensate is arranged to flow thereto and it has an hole and at least one condensate outlet duct leading to the hole, and that the film material of the bag is pierced in the area of the said hole on both sides of the condensate-removal member.

The condensate-removal member sealed inside the bag according to the invention removes the need for glued seams between the condensate-removal strips according to FI patent publication 86961 and the film, and thus the problems of tightness relating to these seams are avoided. Furthermore, since in the present invention the condensate-removal member does not extend as in FI-publication 86961 from one edge of the bag bottom to the other but is substantially narrower than the bag, the solid matter carried in the suspension can fall from the spaces between the bags within most of the width of the bag bottoms, without accumulating as a cake clogging the spaces between the bags above the bottoms. This self-cleaning of the spaces between the bags reduces the need for maintenance of the heat exchanger and increases its capacity by making possible an effective heat exchange over the entire surface area of the bags. Further advantages over FI-publication 86961 include the light weight of the structure and the ease of installation.

According to the invention, the condensate-removal member at the bottom of the bag may be made up of a flat sheet which is thicker and more rigid than the film material. The condensate-removal members belonging to bags which are one against another in the heat exchanger may be pressed one against another to provide support for the lower ends of the bags. What is essential in terms of the invention is that the width of the condensate-removal member is only a fraction, for example approx. 10%, of the width of the bag bottom, in which case the members constitute as small an obstacle as possible to the falling of solid matter from between the bags.

According to the invention, the condensate-removal member has a hole to which the condensate outlet ducts, oriented inwardly from the edge of the member, lead and in the area of which the film material of the bag is pierced on each side of the member. To facilitate the removal of the solid matter, the upper edge of the condensateremoval member is preferably designed downwardly curved or obliquely downward sloping.

The shape of the planar condensate-removal member at the bottom of the bag may according to the invention vary, for example, from triangular to a triangle rounded at its points and further to a round or circular disc. Especially preferably the condensate-removal member consists of a circular disc bonded inside the bag, the disc having radial condensate outlet ducts leading from the edge of the disc to its center, the film material of the bag being pierced at the center of the disc in order to form an outlet aperture for the condensate. The advantage of the disc is that the solid matter between the bags, guided by the curved shape of the disc circumference, flows past the discs without tending to accumulate on top of them as a cake clogging the spaces between the bags.

According to the invention, the condensate-removal member may be located substantially in the middle of the bottom of the bag. In this case the interior of the bag may be divided by bonding into substantially vertical ducts guiding the flow of the vapor and the condensate formed from it, the ducts converging symmetrically at the lower end of the bag, following the inclinations of the bag bottom, towards the condensate-removal member at the bottom. Some of the seams delimiting the ducts in the bag, for example, every second or even two out of three, may come to an end even before reaching the condensate-removal member at the bag bottom; thereby a drastic narrowing of the ducts and the related increased proneness to disturbances are avoided. Water locks formed in narrow ducts would hamper in particular the removal of uncondensed gases; this problem is eliminated by the said option according to the invention.

Alternatively, the condensate may be located at one end of the bag bottom, in which case it is preferable to make the bottom of the bag inclined towards the condensate-removal member. The angle of the gradient may be, for example, within a range of 5–30°.

In addition to the bag-like heat exchange elements described above, the invention comprises a heat exchanger in which the bag-like elements are tied one against another to form a pack. With respect to the characteristics of the heat exchanger, reference is made to accompanying claims 8–10. The heat exchanger may serve, in a manner known per se, as a distillation apparatus, in which the evaporated vapor produced between the bags is collected and compressed by a compressor to a higher temperature and pressure and is used as a heating vapor directed to the interior of the bags, the condensate formed from the vapor leaving the bags as a distillate.

The heat exchange elements according to the invention and the heat exchanger assembled from the elements are suitable for use in the evaporation of effluents which contain solid matter such as fibrous material from the forest industry. They are especially suitable for the treatment of effluents from the bleaching of cellulose.

Figure 6:
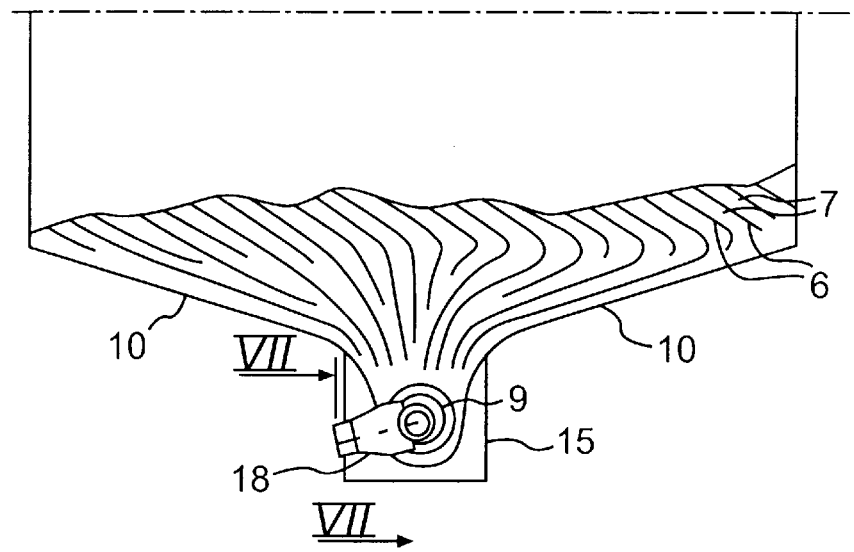
Figure 7:
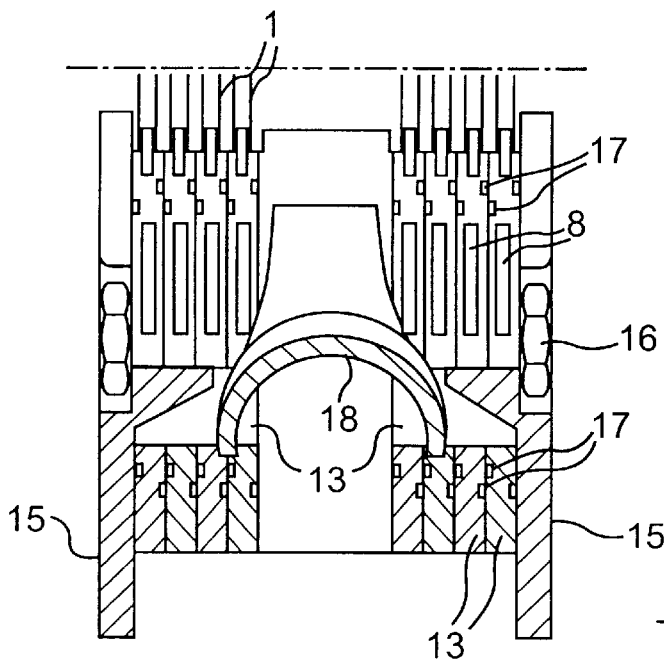
Figure 8:
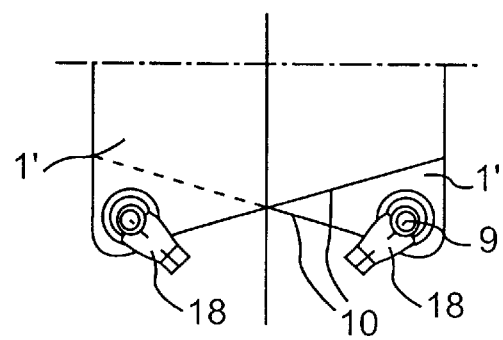

The invention is described below in greater detail with the help of examples, with reference to the accompanying drawings, wherein FIG. 1 depicts one heat exchange element according to the invention for a heat exchanger, made up of a bag of plastic film, FIG. 2 depicts the bag and a disc serving as a condensate-removal member in a cross-section through II—II in FIG. 1, FIG. 3 depicts a circular disc bonded at the bottom of the bag according to FIGS. 1 and 2, the condensate being removed from the bag via the ducts in the disc, FIGS. 4 and 5 depict, in a manner corresponding to FIG. 3, alternate embodiments of the planar condensate-removal member, FIG. 6 depicts the lower end of a bag according to FIG. 1, forming a heat exchange element, the bag being part of a heat exchanger made up of bags stacked one against another, FIG. 7 depicts a condensate collection duct system in a heat exchanger made up of adjacent bags, in a section through VI—VI in FIG. 6, and FIG. 8 depicts, in a manner corresponding to FIG. 6, the lower ends of bags in a heat exchanger in which the condensate-removal members are located alternately at opposite ends of the bottoms of bags stacked into a pack.

An individual heat exchange element according to FIG. 1 for a heat exchanger is an almost rectangular flat bag 1 of plastic film. On the exterior surfaces 2 of the bag 1, i.e. between the bags located one against another in the heat exchanger, there occurs the evaporation of the liquid being treated, such as a fiber suspension, by using heat which is obtained from vapor being condensed in the interior 3 of the bags. When the heat exchanger serves as a distillation apparatus, the evaporated vapor obtained from the liquid is recycled via a compressor as heating vapor condensing in the interior 3 of the bags.

At the upper end of the bag 1 forming a heat exchange element there is a plastic strip 4 which is more rigid than the film material of the bags and which comprises vertical vapor-feeding ducts 5 leading to the interior of the bag. The liquid to be evaporated is fed at the upper end of the bags onto the exterior surfaces of the bags from separate ducts (not shown). The interior 3 of the bag 1 is divided by vertical, substantially zigzagging seams 6 into substantially vertical ducts 7, which communicate with one another laterally via breaks in the seams. The seams 6 thus channel the flow of the vapor and of the condensate formed from it towards the lower end of the bag 1, to which end there is bonded a plastic condensate-removal member which is substantially thicker and more rigid than the film material of the bag and which is made up of a flat disc 9 containing radial condensate outlet ducts 8 (cf. FIG. 3). The bottom 10 of the bag 1, closed by heat sealing the plastic material, is inclined on both sides of the bag at an angle of approx. 15° towards the disc 9, which has a diameter of approx. 10% of the bag width and is located in a recess 11 in the middle of the bottom. The inclined bottom 10 of the bag thus directs the condensate coming from the ducts 7 of the bag interior to the condensate outlet ducts 8 of the disc 9. In addition, the ducts 7 in the interior of the bag converge at the lower end of the bag, following the inclinations of the bag bottom 10, towards the disc 9 in the middle of the bottom, thus contributing to the directing of the forming condensate to the radial ducts 8 of the disc. Some of the zigzagging seams 6 of the bag are discontinued before the bottom of the bag in order to combine adjacent ducts 7 so that a certain minimum duct width is maintained all the way to the disc 9. Thus it is ensured that any uncondensed gases are removed via the disc 9 along with the condensate.

The disc 9 bonded inside the lower end of the bag, best seen in FIG. 3, comprises four radial condensate outlet ducts 8, which lead to an aperture 13 at the center of the disc. The oppositely positioned plastic films of the bag 1 are pierced on both sides of the disc 9 in the area of the aperture 13 so that the condensate and any uncondensed gases can flow out of the bag via the pierced apertures 14 in the film.

The condensate-removal members 9' and 9", shown in FIGS. 4 and 5, are examples of the fact that the disc-like shape of the member 9 according to FIG. 3 is not essential to the invention but may vary. What is common to the condensate-removal members presented is the oblique or downwardly curved upper edges of the member in order to guide the cake of solids past the member, to fall between the oppositely positioned heat exchanger elements, the condensate outlet ducts 8 starting at the edges of the member, and the central aperture 13, in the area of which the heat exchange films are pierced for directing condensate away.

In the heat exchanger the bags 1 according to FIG. 1, serving as heat exchange elements, are tied one against another to form a pack which may be made up of several dozen bags. The vapor-feeding ducts 5, and the liquid-feeding ducts between them, at the upper ends of the bags 1 and the condensate-removal discs 9 at the lower ends of the bags are in the pack pressed one against another, the inclined bottoms 10 of adjacent bags remaining on both sides of the discs 9 sufficiently detached one from another in order to allow the solid matter which has been present in the evaporated suspension to fall between the bottoms so that the solid matter cannot accumulate and clog the spaces between the bags.

FIGS. 6 and 7 show a structure of the lower end of the heat exchanger, wherein the lower ends of bags 1 according to FIG. 1, together with the disc-like condensate-removal members 9 bonded inside them, are positioned one against another between two end sheets 15 supporting the lower ends of the bags, where they are secured together by a bolt 16. The spaces between the discs 9 are sealed by o-ring seals 17, which surround the central apertures 13 of the discs. The apertures 13, in the areas of which the plastic film of the bags 1 has been removed, together form a horizontal condensate-collection duct, which directs the condensate and uncondensed gases coming from the radial ducts 8 of the discs to a common outlet pipe 18, which is located in the middle of the pack assembled from adjacent bags. In the simplified example of FIG. 7 the pack has four bags 1 on each side of the outlet pipe 18, but in practical apparatus applications the number of bags is preferably several dozen. The outlet pipe 18 could optionally also be placed on one side of the pack made up of bags, i.e. in FIG. 7 at either end sheet 15.

In the embodiment according to FIG. 8 of the invention, the heat exchanger is formed by stacking into a pack bag-like heat exchange elements 1' which, in a manner deviating from FIG. 1, comprise a disc 9, bonded inside the bag and serving as a condensate-removal member, at one end of the bag bottom, the bottom 10 of the bag inclining towards that end at an angle of approx. 10°. The assembling of the bags 1' has been carried out in such a manner that the bottoms 10 incline alternately in opposite directions, and the discs 9 are located alternately at opposite ends of the bag bottoms, i.e. on opposite sides of the heat exchanger. On each side the discs 9 are sealed one to another and comprise, in the areas of their central apertures, a common condensate-collection duct pierced in the film material of the bags. The condensate is thus distributed in the heat exchanger substantially equally between two condensate-collection ducts.

For a person skilled in the art it is clear that the various embodiments of the invention are not limited to the examples presented above but may vary within the accompanying claims. For example, it may be unnecessary to make the bottom 10 of the bag 1 according to FIG. 1 to incline towards the condensate-removal disc 9, because during the pressurization of the bag its sides tend to rise so that this alone suffices to provide the bottom inclination required by the condensate flow.

What is claimed is:

1. An evaporator or a distiller comprising a number of bag-like heat exchange elements of a flexible film material tied one against another to form a pack, each element transferring heat from vapor condensed in the interior of the element to a liquid evaporated on the exterior surfaces of the element, and comprising an upper end and a bottom, as well as vapor feeding means leading to the interior of the element and, at the bottom, an outlet for the condensate formed from the vapor, wherein at the bottom of each heat exchange element inside thereof there is bonded a planar condensate-removal member, substantially narrower than the element, which has at least one condensate outlet duct starting from its edge, the duct leading to a hole in the condensate-removal member, wherein the pack of elements comprises condensate-removal members located one against another, sealed together by seals surrounding the apertures, and that the film material of the elements is pierced in the areas of the holes in the condensate-removal members in order to produce a condensate-collection duct common to all of the elements.

2. The heat exchange element according to claim 1, wherein the upper edge of the condensate-removal member is designed downwardly curved or obliquely downward inclined.

3. The heat exchange element according to claim 2, wherein the condensate-removal member is made up of a disc having in its center a hole to which radial condensate outlet ducts, starting at the edge of the disc, lead.

4. The heat exchange element according to claim 3, wherein the condensate-removal member is located at the bottom of the bag in a recess provided for it.

5. The heat exchange element according to claim 1, wherein the bottom (10) of the bag is inclined towards the condensate-removal member at an angle which is at maximum approx. 30°.

6. The heat exchanger according to claim 1, wherein the condensate-removal members are located in the middle of the bottom of each heat exchange element and are sealed one to another in the pack of elements, and that the film material of the elements is pierced in the areas of the holes in the condensate-removal members in order to produce a condensate-collection duct common to all of the elements.

7. The heat exchanger according to claim 1, wherein the condensate-removal members (9) are each located at one end of the bottom of a heat exchange element, that the elements are assembled into a pack so that the condensate-removal members are located alternately at opposite ends of the element bottoms, and that at each end, the condensate-removal members are sealed one to another and comprise, in the areas of their holes, a common condensate-collection duct pierced in the film material of the elements.

8. The heat exchanger according to claim 1, wherein the bottom of the bag is inclined towards the condensate-removal member at an angle within the range of 5–30°.

* * * * *